US005691909A

United States Patent [19]
Frey et al.

[11] Patent Number: 5,691,909
[45] Date of Patent: Nov. 25, 1997

[54] METHOD OF VIRTUAL MACHINING TO PREDICT THE ACCURACY OF PART TO BE MADE WITH MACHINE TOOLS

[75] Inventors: Daniel D. Frey, Cambridge, Mass.; Timothy W. Hykes, Greencastle, Pa.; Kevin N. Otto, Watertown, Mass.

[73] Assignee: Western Atlas, Waynesboro, Pa.

[21] Appl. No.: 581,337

[22] Filed: Dec. 29, 1995

[51] Int. Cl.$^6$ .................. G05B 19/4069; G06F 15/46
[52] U.S. Cl. .................. 364/474.01; 364/474.01; 364/578; 364/474.24; 364/474.17; 364/474.18; 364/571.02
[58] Field of Search .............. 364/474.28, 474.35, 364/474.01, 474.22, 474.24, 474.3, 474.21, 468.19, 474.02, 474.06, 474.11, 474.16, 474.17, 474.18, 474.29, 474.37, 167.01, 191, 560, 468.03, 468.2, 468.21, 468.22, 474.15, 571.01, 571.02, 571.05; 451/21, 22; 29/26; 408/11; 409/9, 80

[56] References Cited

U.S. PATENT DOCUMENTS

| 4,283,669 | 8/1981 | Jacoby ........................ 364/474.37 |
| 4,621,434 | 11/1986 | Hirschmann ................... 33/503 |
| 4,660,148 | 4/1987 | Kishi et al. . |
| 4,769,763 | 9/1988 | Trieb et al. .................... 364/559 |
| 4,833,617 | 5/1989 | Wang . |
| 4,837,703 | 6/1989 | Kakazu et al. . |
| 4,868,761 | 8/1989 | Hayashi . |
| 4,918,627 | 4/1990 | Garcia et al. . |
| 5,122,717 | 6/1992 | Hayashi . |
| 5,150,305 | 9/1992 | Sekikawa . |
| 5,247,651 | 9/1993 | Clarisse ........................ 395/500 |
| 5,249,135 | 9/1993 | Fujita . |
| 5,257,204 | 10/1993 | Sawada et al. ................ 364/474.24 |
| 5,274,574 | 12/1993 | Tsujido et al. . |
| 5,276,974 | 1/1994 | Chanoni et al. ................ 33/546 |
| 5,309,364 | 5/1994 | Aramaki et al. ............... 364/474.578 |
| 5,315,525 | 5/1994 | Blüthgen et al. . |
| 5,317,519 | 5/1994 | Maeda . |
| 5,323,325 | 6/1994 | Izumiya . |
| 5,325,308 | 6/1994 | Oyama . |
| 5,337,249 | 8/1994 | Fujita et al. . |
| 5,351,196 | 9/1994 | Sowar et al. . |

(List continued on next page.)

FOREIGN PATENT DOCUMENTS 0211202  2/1987  Germany .
2049995 12/1980  United Kingdom .

OTHER PUBLICATIONS

United Kingdom, Method of and apparatus for measuring distance in numerically controlled machine tools., GB2069142/PN Aug. 1981.
World Intellectual Property Organization, Method of and apparatus for scanning the surface of a workpiece, WO9007097 Jun. 1990.

Primary Examiner—Emanuel T. Voeltz
Assistant Examiner—Cuong H. Nguyen
Attorney, Agent, or Firm—Hoffman, Wasson & Gitler, P.C.

[57] ABSTRACT

A method is provided for virtual machining which helps predict the accuracy of parts to be made on machine tools, allocates errors in design and manufacture of machine tools, and diagnoses the source of errors in machine tools. More particularly, the present invention relates to a method which calculates the "error shape" of a part being manufactured based upon the position, orientation, velocity and shape of the machine tool. The method predicts the statistical distribution of part size, form, and profile errors in a population of parts by superposing "error shapes." The machine errors are diagnosed by matching post process gauging data with a linear combination of "error shapes." The method predicts the magnitude and pattern of errors in a machined part, performs a simulation taking into account the geometry of the machine, the commanded machine motions as a function of time, error motions of the machine's components as a function of time, and the shape of the tool. The output is the location of a set of discrete points on the surface of a part.

23 Claims, 4 Drawing Sheets

U.S. PATENT DOCUMENTS

| | | |
|---|---|---|
| 5,355,062 | 10/1994 | Takizawa et al. ............... 318/568.1 |
| 5,377,116 | 12/1994 | Wayne et al. . |
| 5,396,160 | 3/1995 | Chen . |
| 5,402,354 | 3/1995 | Okino et al. . |
| 5,416,715 | 5/1995 | Kinoshita et al. . |
| 5,565,748 | 10/1996 | Takizawa et al. ............... 318/568.1 |
| 5,587,937 | 12/1996 | Massie et al. .................... 364/578 |
| 5,596,256 | 1/1997 | Takizawa et al. ............. 364/474.28 |

METHOD OF VIRTUAL MACHINING TO PREDICT THE ACCURACY OF PART TO BE MADE WITH MACHINE TOOLS

BACKGROUND OF THE INVENTION

1. Field of the Invention

The present invention relates to a method for virtual machining which helps predict the accuracy of parts to be made on machine tools, allocates errors in design and manufacture of machine tools, and diagnoses the source of the errors. More particularly, the present invention relates to a method which calculates the "error shape" of a part being manufactured based upon the position, orientation, velocity, and shape of the machine tool. The method predicts the statistical distribution of part size, form, and profile errors in a population of parts by superposing "error shapes." The machine errors are diagnosed by matching post process gauging data with a linear combination of "error shapes." The method predicts the magnitude and pattern of errors in a machined part, performs a simulation taking into account the geometry of the machine, the commanded machine motions as a function of time, error motions of the machine's components as a function of time, and the shape of the tool. The output is the location of a set of discrete points on the surface of a part.

2. Description of the Prior Art

Virtual machining is computer simulation of machine tool operation. Simulations of physical processes vary widely in the amount of detail they provide. Virtual machining could imply a detailed finite element analysis including thermal effects varying over time, response of the machine to loading, and detailed modeling of the physics of chip formation. In many contexts such detailed simulation is not feasible. There is a need for an extensible simulation framework which can handle problems common to all machine tools, (kinematic, geometrical, statistical, etc.) and which allows for more detailed analysis of individual error sources and more sophisticated post processing of the simulation output as required for different specific applications.

One problem in the construction of a virtual machining simulation is the solution of the kinematics and geometry that map machine error motions into work piece geometry. Many methods have been devised to construct kinematic models for the design and analysis of machine tools. Such methods determine the accuracy of the machine tool by estimating error in the position of the tool point, but do not address the issue of how to map errors in tool point position into the part geometry. This problem has been identified by the National Institute of Standards and Technology as an outstanding research challenge. One method solves this problem for single point cutting tools, and calculates sensitive directions as a function of the surface slope of the part. Such a method, however, is not applicable to cutting tools where the geometric interaction of the tool and the work is more complex. For milling cutters and grinding wheels, the cut made by the tool may be a function not only of the position of the tool, but also of the shape of the tool, the tool orientation, and the direction of tool travel. There is therefore a need for a method which combines kinematic models of machines with a geometric construction that solves for part geometry.

Methods exist for diagnosing machine error sources using ball bar test results. The methods comprise steps to identify similarities between test results and known error traces. Virtual machining allows such diagnostic procedures to be applied to match post process gauging data to machining simulation output. Thus diagnostics can be performed without a ball bar test. Furthermore, the virtual machining framework allows such diagnostic techniques to be extended to other machines other than three axis NC machines. Machines with any serial kinematic configuration can be modeled and analyzed.

Machining simulations can be used to formulate more complete and accurate error budgets. An error budget is a system analysis tool used to predict and control the total error of a system at the design stage. Existing methods combine errors within an error budget to yield reasonable estimates of a machine's accuracy. Such methods are limited to uncorrelated errors with normal or uniform distributions. In addition, the combination rules are not directly applicable to tolerances of form.

CNC Crank Pin Grinding

The following discussion is directed to a computer numerically controlled (CNC) crank pin grinding machine. The methodology of operation of such a crank pin grinding machine is meant as an example and provides background for use with other machines.

In a typical engine crank shaft, main journals located on the centerline of the part support the shaft as it rotates. Crank pins, arranged concentrically about the shaft centerline, serve as journal bearings for the connecting rod that transfers forces between the pistons and the crank shaft. Because the forces on the pins are high and the bearing must function efficiently, the clearance between the crank pins and the coupler arm must be accurate and consistent. Therefore, tight tolerances must be held on size and cylindricity of the crank pins.

The distance of a crank pin centerline from the crank shaft centerline (throw) determines the stroke of the piston. The stroke has a strong effect on the compression ratio of the engine and therefore on engine efficiency, performance, and emissions. Accurate control of engine stroke is also necessary for proper engine balance. The angular position of the crank pins about the crank shaft centerline (index) controls the timing of the piston motions. Timing, like stroke, affects many engine performance parameters. Therefore, tight tolerances must be held on the location (index and throw) of the crank pins.

Engine performance demands are escalating. Consumers demand higher quality, greater reliability, and lower noise, vibration, and harshness (NVH). Corporate Average Fuel Economy Standards obligate engine manufacturers to seek better fuel economy. Federal and state environmental regulations demand that engine emissions be reduced. One key to meeting these demands is greater precision in manufacture of engine parts in general, and crank shafts in particular.

When tight tolerances on the geometry of a part are required in high volume production, grinding is often the best manufacturing process. Grinding can generally hold tighter tolerances than milling because the depth of the cut is lower and the cutting forces are lighter. Grinding generally allows shorter cycle times than turning because the multiple cutting points allow higher material removal rates. Therefore, grinding equipment manufacturers must respond to the need for tighter tolerances in automotive parts.

The simultaneous demands for greater flexibility and high precision in manufacture of auto parts compels grinding machine manufacturers to seek new designs. One answer has been to shift from indexing to CNC "chasing the pin" grinding machines.

In an indexing crank pin grinding machine, the crankshaft rotates about the crank pins as if it is ground. This is accomplished by fixturing the leftmost and rightmost main journals in bearing blocks offset from the work spindle centerline. After one pin is ground to size, the next pin to be ground must be brought into alignment with the work spindle centerline. This is done by indexing the crankshaft about the centerline of the main journals. To allow this, an indexing plate is connected in series between the work spindle and the bearing blocks.

Indexing crank pin grinding machines are not very flexible. To reconfigure a machine to grind crankshafts with different strokes, the position of the bearing block must be adjusted and the centerline of the mechanical indexing plate must remain aligned with the centerline of the main journals of the crank shaft. Performing this adjustment mechanically is time consuming. Efforts to automate the adjustment process have not been very successful. It is difficult to stack a CNC prismatic joint and two CNC revolute joints in series while maintaining stiffness and repeatability.

These considerations have led to the introduction of CNC "chasing the pin" grinding machines. On this type of machine, the crank shaft rotates about the main journal centerline and the grinding wheel reciprocates under numerical control to maintain the proper position with respect to the crank pin. Adjustments for index and throw changes in different pins and on different crank shafts are made through changes in the control program, rather than mechanically. Thus, some of the complexity of the manufacturing process is shifted from the mechanical systems into electronic systems.

The shift of complexity from mechanical systems to electronic systems makes CNC crank pin grinding significantly more agile than indexing grinding. The shift from one crank shaft to another on a CNC grinding machine can potentially be made entirely through software.

Indexing grinding machines are currently more accurate than CNC "chasing the pin" machines. In the indexing grinding process, the crank pin can be supported by shoes as they rotate and it is easier to implement in-process gauging. However, error mapping techniques are allowing CNC grinding machines to achieve micron level accuracy. Most of the repeatable errors in size, roundness, index, and throw of the crank pins can be compensated by NC control. However, many errors in taper, parallelism, and center deviation must be built into the machine. This makes rigorous error budgeting a necessity in the design of CNC crank pin grinding machines.

The advantages of CNC grinding come at the expense of mathematical complexity. In the indexing grinding machine, errors in size are affected principally by the position of the grinding wheel, errors in index are caused mainly by angular orientation of the mechanical indexing plate, and errors in throw are determined chiefly by the radial location of the bearing block. If size, index, and throw are considered functional requirements of the grinding machine, and the machines adjustment parameters and build tolerances are considered design parameters, then the indexing grinding machine may be considered an uncoupled design. In the CNC grinding machine, most error sources affect more than one of the tolerances called out on the crank pins. For example, wear of the grinding wheel can cause errors in size, throw and roundness.

The coupling of the error sources and tolerances makes error diagnosis more difficult. For instance, if variability in throw is detected on the indexing grinding machine, the cause is almost always variability in the location of the bearing block. But if the parts were made on a CNC grinding machine, the source of the error could be grinding wheel wear, variability in the diameter of the main journals, Z squareness of the X axis carriage, or perhaps dozens of other causes.

Coupling also makes it more difficult to assign rational tolerances to the construction and operation of the machine. In order to meet the throw tolerance in the error budget for index crank pin grinding machines, only one or a few errors must be estimated and combined. In the error budget for the CNC grinding machine, the effects of nearly all the errors in the machine must be considered and combined to meet the specification on throw.

The analytical difficulties in CNC crank pin grinding machines should not prevent their successful introduction into the automotive industry. The advantages in agility of the process should prevail. But the mathematical complexity demands better analysis tools. The foregoing situation makes CNC crank pin grinding an excellent opportunity for the virtual machining framework of the present invention.

SUMMARY OF THE INVENTION

These and other deficiencies of the prior art are addressed by the present invention which is directed to a method which combines kinematic models of machines with a geometric construction that solves for part geometry. The method automatically matches post process gauging data to simulation output in a least squares sense to yield estimates of error source magnitudes. The method uses monte carlo simulation to combine errors estimated by machining simulation. The method allows the user to define any probability distribution function (pdf) for the error sources including correlations among errors. The method samples at random from the source pdf's to create a population of virtual parts, and then estimates the statistical distributions of tolerances of size and form within the population of virtual parts.

BRIEF DESCRIPTION OF THE DRAWINGS

These and other attributes of the present invention will be described with respect to the following drawings in which.

DETAILED DESCRIPTION OF THE INVENTION

Figure 1:
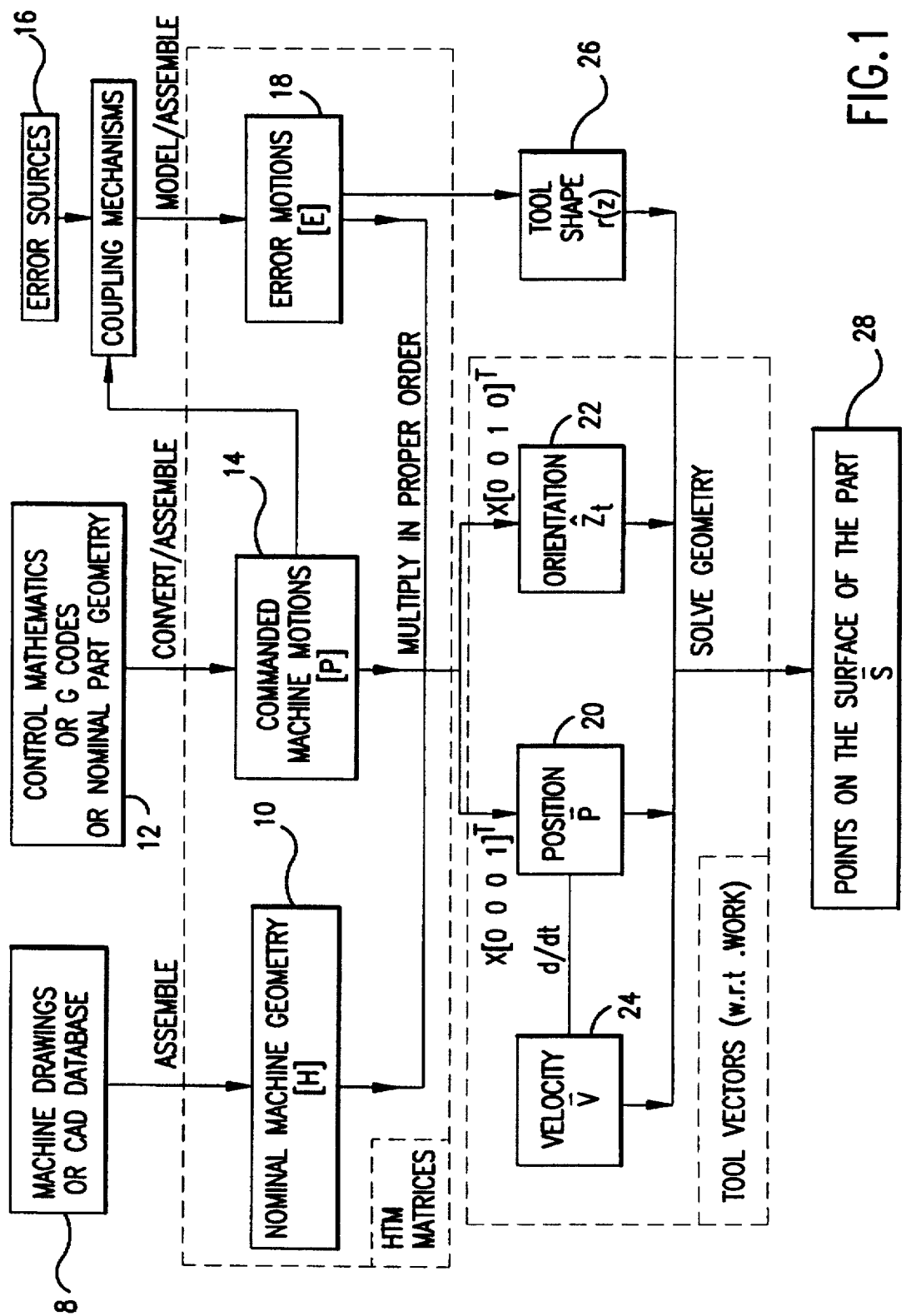
FIG. 1 is a block diagram of the architecture of a virtual machining simulation according to the present invention.

FIG. 1 shows a block diagram of the architecture of the method of the present invention which predicts the pattern of errors in machined parts. The method performs a simulation taking as input the geometry of the machine, the commanded machine motions as a function of time, error motions of the machine's components as a function of time, and the shape of the tool. The output is the location of a set of discrete points on the surface of a part.

The simulation is based on a homogeneous transformation matrix (HTM) model of the machine. HTM models have been used for years in modeling machine tools. However, HTM models are typically used only to determine the accuracy of the location of the tool. The method of the present invention predicts accuracy in size, form, and profile of specific parts to be made on the machine tool. The essential feature to achieving the forgoing result is utilizing the tool's location, orientation, velocity, and shape to calculate a set of discrete points on the surface of a part.

In FIG. 1, the machine's nominal geometry [H](t) in step 10 is derived from machine drawings or a CAD database 8. The commanded machine motions [P](t) of step 14 are determined from control mathematics or G Codes or nominal part geometry of step 12. Anticipated sources of error of step 16 are used in step 18 of the HTM model to determine error motions [E](t). The machine geometry [H](t) from step 10, the commanded machine motions [P](t) of step 14, and the error motions [E](t) of step 18 are used to determine the tool position p(t) in step 20, the tool orientation z(t) in step 22, and from the tool position p(t) the tool velocity v(t) in step 24. The outputs from steps 24, 20, and 22 namely the tool velocity, position and orientation, in the form of vectors, are used to solve the geometry along with the error motions [E](t) which are also employed to determine the tool shape r(z) in step 26. The result is datum points on the part in step 28.

For many machining operations, such as turning and boring, it is adequate to consider the tool as a single point. One can assume that wherever the tool point is at any moment in time, a point on the surface of the part is created. From this assumption, the mapping from tool point location to surface datum points is one-to-one. In many machining operations the mapping is much more complicated. The points being cut on the part at a given time are not only a function of the location of the tool, but also of its shape, orientation, direction of travel, and the angular velocity of the tool. In general the solution of the problem requires subtraction of the volume occupied by the tool from the volume of the stock material at a sufficient number of discrete locations. Such a method is very computationally intensive. However, with a few simplifying assumptions, many common machining operations can be adequately modeled with a less computationally intensive method.

Many cutting tools, such as milling cutters and grinding wheels, generate the speed of the cutting point by rotation of the tool rather than rotation of the part. The shapes of such tools can generally be modeled as surfaces of revolution. To make a preliminary estimate of the location of the point being cut on the surface of the part at any given time it is assumed:

1) the cut is made exactly at the surface of the tool, ignoring effects such as built up edge or elastic deflection of the tool or the work for the initial estimate;

2) the velocity of the tool is nearly orthogonal to the axis of rotation of the tool, and 3) in the case of milling, that the rotational velocity of the tool is large compared to the feed rate so that scalloping of the surface is negligible.

Figure 2:
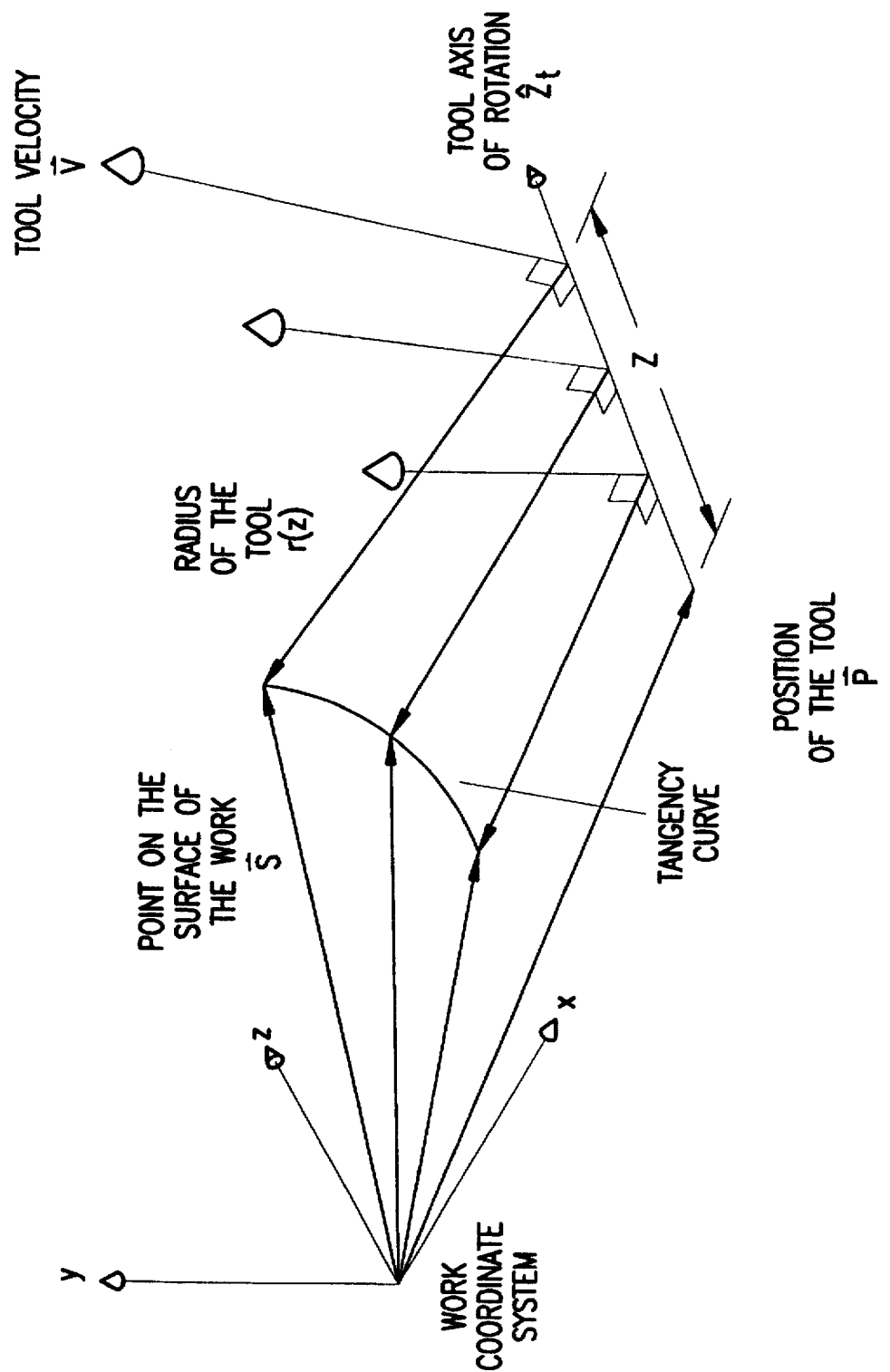
FIG. 2 is a geometric construction for calculating datum points on a part according to the present invention.

FIG. 2 illustrates the procedure for calculating the location of a point on the surface of a part. First the location of a point along the axis of rotation is transformed into the local coordinate system of the part. Second, the velocity of that point is calculated by performing a central difference numerical differentiation of the location of the point. Third a vector is set to the radius of the tool at that axial position. It is assumed that the radius of the tool is a known function of the axial location. The endpoint of the vector is a position on the surface of the part.

The foregoing method works even if the tool rotates as it feeds forward. Rotations about the axis of symmetry are non-sensitive. Rotations about other axes are taken into account since the velocity vector is calculated at many axial locations along the tool.

Figure 3:
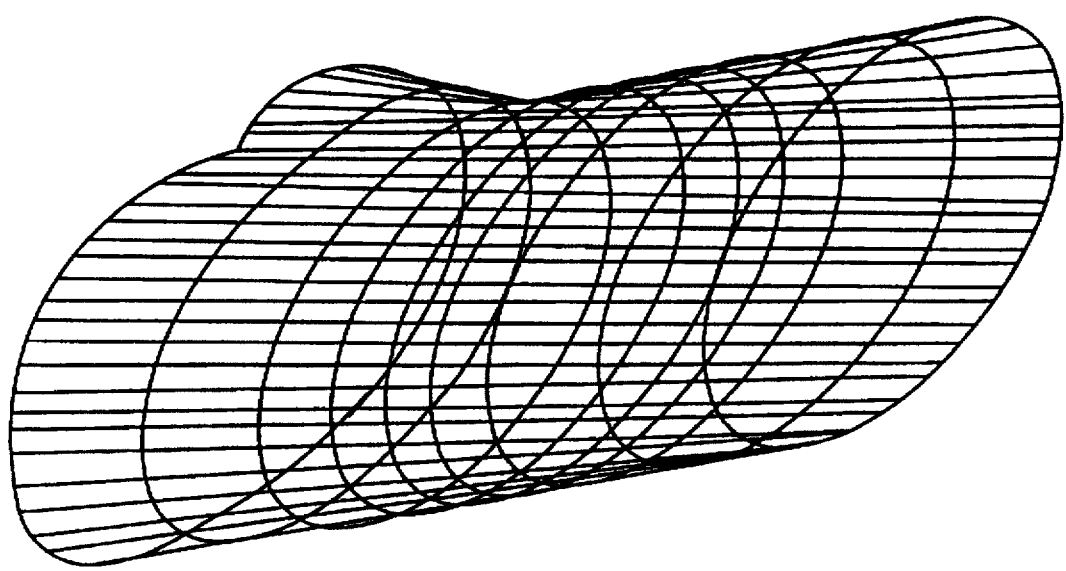
FIG. 3 is a perspective view of an error shape due to a parallelism error in a CNC grinding machine according to the present invention.

An example of the output of the method of the present invention is shown in FIG. 3. FIG. 3 was generated by setting one error in the simulation to a known value and setting all the other errors to zero. The simulation yielded a set of discrete points on the surface of a virtual part. The distances between points on the virtual part and corresponding points on an "ideal" part are error values. An ordered set of error values for a virtual part is its error shape. The order of the values determines the point on the "ideal" part which served to define the error value. This ordering ensures proper correspondence among error shapes so that they can be superposed to yield composite error shapes. By generating and storing such error shapes for a set of anticipated sources of error in a machine tool, new methods of analysis become possible and computationally tractable.

Predicting Statistical Distribution of Errors

The set of discrete points serves as an input to a build-tolerance allocation tool. Such a tool should help engineers set more rational tolerance values on build errors and other error sources in machine tools by providing estimates of the statistical distribution of the size of the error, the form and the profile of parts.

Figure 4:
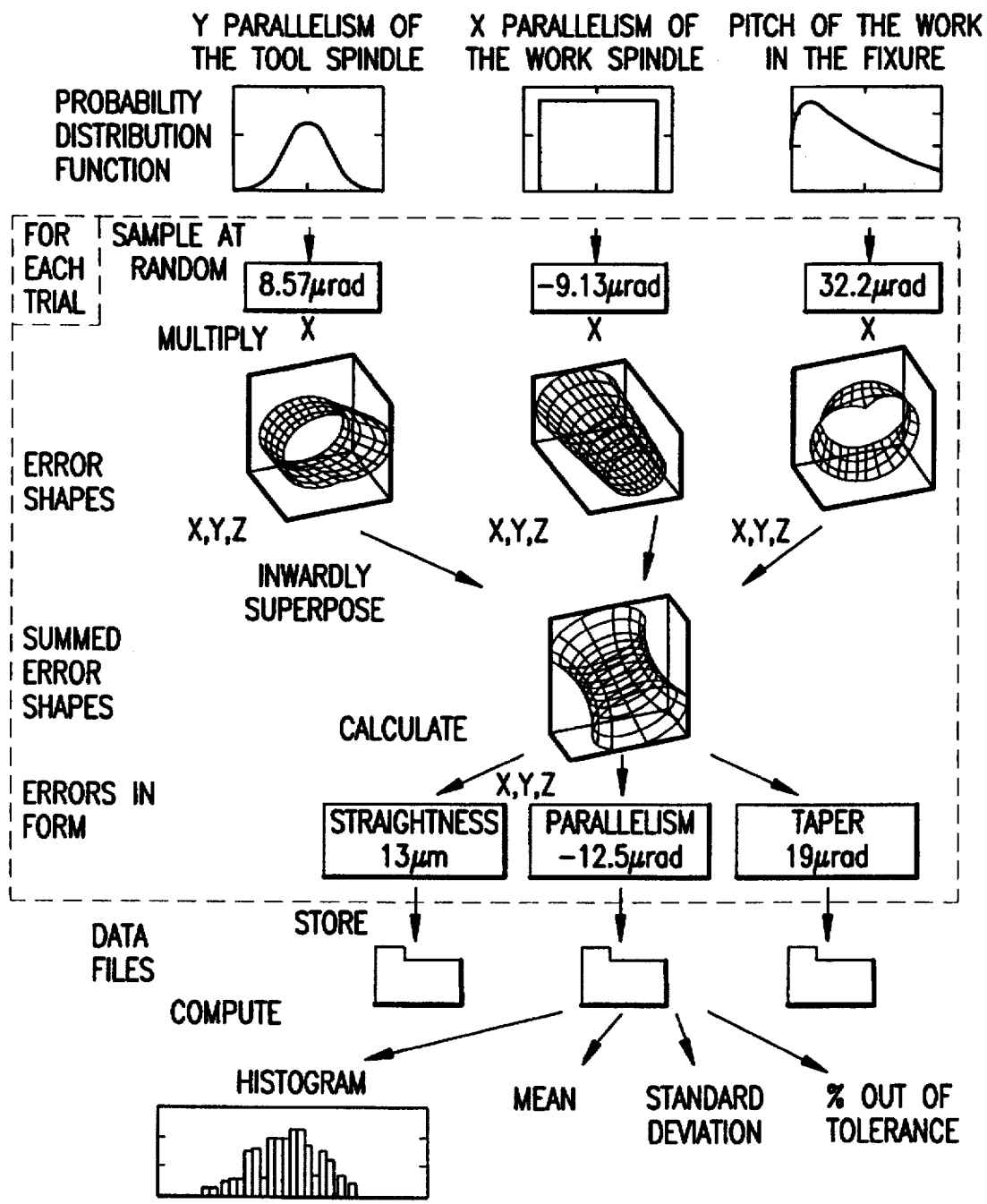
FIG. 4 is a diagram showing operation of a monte carlo simulation according to the present invention.

FIG. 4 shows a method of the present invention using a monte carlo simulation. The tool allows the user to define the probability distribution function (pdf) of various sources of error. For a designated number of trial parts the method randomly samples from the user defined pdf's to determine the magnitude of the error in each individual part. The method multiplies the magnitudes by the error shape values, point by point, and superposes the various error shapes to yield an error shape for that particular trial part. This error shape is processed to determine errors in size, form and profile. The values of the errors are stored for each trial and can later be used to characterize the statistical distribution of the error in several ways, such as a histogram, a mean value, a standard deviation,and/or a percentage out of tolerance.

Errors Diagnosis

In practice errors may arise during construction or operation of the machine tool that fall outside of the designated acceptable limits. When this happens the error may be detected by post process gauging of manufactured parts. It would be very useful to be able to diagnose the source of errors using already gathered post process gauging data. The error shapes allow such diagnosis to be formed if:

1) the actual error source is anticipated and has a stored error shape, 2) the set of anticipated error shapes are distinct from one another, i.e., no error shape can be formed by linearly combining any set of other anticipated error shapes, 3) the post process data has an adequate signal to noise ratio, and 4) the error source magnitude is single valued, i.e., it cannot change appreciably over the time the part is manufactured or as a function of carriage position.

The method for diagnosis is to perform a least squares fit of the post process gauging data with a linear combination of error shapes. A linear combination of error shapes is formed by (1) multiplying each error value in each error shape by a gain factor, each error shape has a distinct gain factor that is applied to all error values in that error shape; (2) summing the corresponding error values of all the error shapes to form a composite error shape. The composite error shape can be compared to an error shape assembled from measurement of a real part manufacturing on the machine being simulated. The gain factors can be adjusted to match the composite error shape to the real error shape as closely as possible. Linear regression is an established mathematical procedure which can be used to find the gain factors that minimize the sum of the squares of the differences between two ordered sets of numbers. If the residual of the fit is low, and the fit is parsimonious, then the user can be reasonably confident that the source of the error is given by the coefficients of the least squares fit. If the error shapes are generated using one unit of error source, e.g., one micrometer or microrad depending on the context, then the coefficients give the magnitude of the error source.

The following further description of the method of the present invention focuses on machining simulations of grinding machines. Emphasis is on the structure of the simulation rather than on the details of modeling errors specific to individual machines. The framework described herein is not the only possible way to structure a machining simulation. The methods are especially suited to implementation in commercial mathematics software such as Matlab and Mathcad.

All inputs to the model are made through the homogeneous transformation matrices (HTMs). Any variable that affects the output of the simulation does so by affecting the elements of one or more HTM.

The machine tool is modeled as two serial kinematic chains of rigid bodies, each having its own local Cartesian coordinate system (LCS). One chain extends out to the base of the tool. The other chain extends from the base out to the work piece. The base is numbered zero. The bodies in the kinetic chain of the work are numbered one through m.

The simplest approach is to consider each moving carriage of the machine to be a rigid body, but the machine can be discretized further if appropriate. For example, in the CNC crank pin grinding machine, the grinding wheel spindle body is bolted to the X axis carriage. In order to model errors in alignment of the spindle, the grinding wheel spindle can be considered a separate rigid body.

The formation of modeling machine tools as a collection of rigid bodies does not preclude the integration of mechanical and thermal deformations into the model. Rather, it simply requires that such deformations be characterized in terms of rigid body motions that cause equivalent motions of the tool with respect to the work.

There are three different types of HTMs in the method of the present invention: H matrices which describe the nominal geometry of the machine in its "home" position, P matrices which describe the "pose" of the machine resulting from commanded machine motions, and E (error) matrices which describe all variations in the performance of the machine from nominal. This division improves the organization of the simulation and, as explained below, facilitates the modeling of different types of joints.

The form of the HTMs used here for H and P type matrices is:

$$\begin{bmatrix} 1 & 0 & 0 & X \\ 0 & 1 & 0 & Y \\ 0 & 0 & 1 & Z \\ 0 & 0 & 0 & 1 \end{bmatrix} \cdot \begin{bmatrix} 1 & 0 & 0 & 0 \\ 0 & \cos(\alpha) & -\sin(\alpha) & 0 \\ 0 & \sin(\alpha) & \cos(\alpha) & 0 \\ 0 & 0 & 0 & 1 \end{bmatrix} \cdot \quad (1)$$

$$\begin{bmatrix} \cos(\beta) & 0 & \sin(\beta) & 0 \\ 0 & 1 & 0 & 0 \\ -\sin(\beta) & 0 & \cos(\beta) & 0 \\ 0 & 0 & 0 & 1 \end{bmatrix} \cdot \begin{bmatrix} \cos(\gamma) & -\sin(\gamma) & 0 & 0 \\ \sin(\gamma) & \cos(\gamma) & 0 & 0 \\ 0 & 0 & 1 & 0 \\ 0 & 0 & 0 & 1 \end{bmatrix}$$

where X, Y, and Z are displacements in the x, y, and z directions and $\alpha$, $\beta$, and $\gamma$ are rotations about the x, y, and z axes. This general form of HTM allows for large rotations so that local coordinate systems can be reoriented to model slideways in any orientation and to permit modeling of revolute joints. If more than one of $\alpha$, $\beta$, and $\gamma$ is non-zero in any given H or P matrix then one should take note of the order in which the rotations are performed. It will make a large difference in the result of the transformation.

The form of the HTM used for the E matrices is:

$$\begin{bmatrix} 1 & -\epsilon_z & \epsilon_y & \delta_x \\ \epsilon_z & 1 & -\epsilon_x & \delta_y \\ -\epsilon_y & \epsilon_x & 1 & \delta_z \\ 0 & 0 & 0 & 1 \end{bmatrix} \quad (2)$$

where $\delta_x$, $\delta_y$, and $\delta_z$ are displacements in the x, y, and z directions and $\epsilon_x$, $\epsilon_y$, and $\epsilon_z$ are rotations about the x, y, and z axes. This linearized form of HTM is appropriate as long as the rotations are small. If the rotations are not small, as in a flexible structure, one can use the form of equation 1 with a small penalty in computation time.

If the LCS of the $i^{th}$ rigid body moves with the $i^{th}$ rigid body then the HTM that transforms a point in the tool chain's $i^{th}$ coordinate system into its equivalent in the $(i-1)^{th}$ coordinate system is:

$$^{i-1}T_i = H_i \cdot E_i \cdot P_i \quad (3)$$

Equation 3 is appropriate for prismatic joints which are included in most linear carriages. It should also be used for revolute joints with moving sensitive directions.

If $i^{th}$ LCS is fixed with respect to the $i-1^{th}$ rigid body then the HTM is $$^{i-1}T_i = H_i \cdot P_i \cdot E_i \quad (4)$$

Equation 4 should be used for prismatic joints and for revolute joints with fixed sensitive directions. The HTM that transforms a point on the tool into its equivalent in the base coordinate system is $$^0T_m = \prod_{i=1}^{a} {}^{i-1}T_i = {}^0T_1 \cdot {}^1T_2 \cdots {}^{a-1}T_m. \quad (5)$$

Equations 3, 4, and 5 apply to the base-to-work serial chain except that the HTMs are designated W (and they number through m rather than n).

Assembling the Homogeneousd Transformation Matrices

To assemble the H matrices for a given machine, one must first judiciously choose the location and orientation of the local coordinate systems for each rigid body. For prismatic joints, the location of the LCS is the point about which the angular error motions occur. For machines at the design stage, the LCS are commonly placed at the center of the stiffness of the carriage. However, if a straightness error has been measured for a carriage, it is most convenient to place the LCS on the line along which the straightness error is measured. Any location of the LCS is acceptable as long as linear displacements and angular motions are defined under the same set of assumptions.

For prismatic joints, the orientation of the LCS determines the direction the carriage moves and the directions in which the error motions of the carriage are applied. It is best to orient the LCS with one of the principle directions along the slideways. For revolute joints, the LCS should be placed along the axis of rotation with one of the principle directions aligned with the axis of rotation.

To assemble the H matrices, data pertaining to the nominal geometry of the machine is necessary. It would be most efficient for the machine simulation to directly access a CAD database. For the CNC crank pin grinding machine, the nominal geometry of the machine was input manually from engineering drawings.

To assemble the P matrices for a given machine, one must define the commanded machine motions as a function of time needed to make a specific part. These can be translated from G codes or calculated from nominal part geometry. For the CNC crank pin grinding machine, the function for the x axis carriage position, as a function of work spindle angular orientation was derived in closed form and placed into the P matrix for the x carriage.

To assemble the E matrices we assume that any errors that arise in the part are ultimately traceable to an error source. The error source values are measurable quantities which are related to the error motions through a coupling mechanism. For many geometric errors, such as error in the parallelism of two rigid bodies, no coupling mechanism is required. The error source values can be entered directly into the appropriate E matrix.

In some cases, the coupling mechanism is a function of the pose of the machine and therefore of the P matrices. For example, errors due to the inertia of the carriage may be a function of the second derivative of an element of the P matrix of the carriage.

Some error source such as straightness error, or once per revolution lead screw error are defined by multiple discrete values by a function rather than a single value. Such multiple valued error sources can be measured and read into the machining simulation. If measurement of the error source values is not feasible (as when the machine is in the design stage) the form of the error can be assumed. In such a way, a multiple valued error source can be defined by a single value.

Error coupling mechanisms can in principle be a function of time, state of the machine, history of the machine, other error sources, etc. Modern mathematical software packages provide an environment in which very detailed models can be constructed. As long as these errors can be translated into machine error motions, they can be integrated into the virtual framework of the present invention.

Calculating Points on the Surface of the Work Piece

The HTM matrices provide information needed to solve for the location of points on the surface of the part. The vector $\bar{p}$ from the work LCS to a point on the surface of the part is given by:

$$\bar{p} = {_o}W_n^{-1} \cdot {_o}T_m (0\ 0\ 0\ 1)^T \tag{6}$$

For many operations, such as turning and boring, the tool can be considered a single point. The assumption can be made that wherever the point of the tool is at any given moment, a point is made on the surface of the part. With this assumption, the mapping from tool point location ($\bar{p}$) to surface point ($\bar{s}$) is one to one.

The mapping of many other machining operations is much more complicated. The points being cut on the part at any given time are not only a function of the location of the tool, but also are a function of the tool shape, direction of tool travel, tool orientation, and the rate of change in orientation. In general, the solution of the problem requires subtraction of the volume occupied by the tool from the volume of the stock material at a sufficient number of discrete locations. Such a method is very computationally intensive. However, with a few simplifying assumptions, many common machining operations can be adequately modeled with a less computationally intensive method.

Many cutting tools, such as milling cutters and grinding wheels, generate the speed of the cutting point by rotation of the tool rather than rotation of the part. The shapes of such tools can generally be modeled as surfaces of revolution. For an initial estimate, it can be assumed that the tool removes any material from the work that lies within the surface of revolution. Any effects such as deflection of the tool can be modeled as error motions and subsumed on the E matrix. Tool wear or built up edges can be modeled as parameters affecting the size or shape of the tool. Equation 6 gives the location of a point at the root of the axis of rotation of the tool $\bar{p}$. The unit vector defining the orientation of the axis of rotation of the tool with respect to the coordinate system of the part is:

$$\bar{z}_1 = {_o}W_n^{-1} \cdot {_o}T_m (0\ 0\ 1\ 0)^T \tag{7}$$

Replacing the one with a zero in the fourth position of the vector suspends the translation components of the HTMs and allows the z direction unit vector to be affected by only the angular error motions. The velocity of a point along the axis of rotation at a distance z from the root is:

$$\bar{v} = \frac{d}{dt} ({_o}W_n^{-1} \cdot {_o}T_m (0\ 0\ z\ 1)^T) \tag{8}$$

To best approximate the direction of travel of the tool, the differentiation in equation 8 should be performed by central difference.

The interaction of the surface of the tool and a plane normal to the axis of rotation of the tool will define a circle of radius r(z). A point of tangency between the tool and the work will be the point where the circle is tangent to the direction that the circle is traveling. Therefore, a point on the surface of the part is given by:

$$\bar{s} = \bar{p} + z \cdot \bar{z}_1 = r(z) \cdot \frac{\bar{v} \times \bar{z}_t}{|\bar{v} \times \bar{z}_t|} \tag{9}$$

The foregoing equation 9 assumes that machine is cutting a profile counter-clockwise about the work, as viewed looking down the z axis of the tool. If the tool is profiling clockwise; the sign of the last term in equation 9 should be negative. If the tool is cutting a trough, then two points on he part can be calculated for each z position. This procedure assumes that only the finishing cut is simulated. Roughing cuts will not usually determine the final location of points on the surface of the part.

Solving for Tool Shape

For most tools, the shape of the tool is known prior to running the simulation. However, if a grinding wheel is dressed on the same machine on which it is used, then the shape of the wheel may be affected by the error sources. On the CNC crank pin grinding machine, a diamond dressing wheel is mounted on the z axis carriage. The grinding wheel is fed into the dressing wheel and the z axis carriage is traversed to move the dresser across the surface of the wheel.

The dressing process was modeled in the machining simulation to solve for the shape of the grinding wheel. First, a vector $\bar{c}$ was constructed to define the location of the diamond point with respect to the z axis carriage. Second, new P matrices were constructed to simulate the motion of the carriages during dressing. At a series of discrete locations of the carriage, the position of the diamond dressing wheel in the coordinate system of the grinding wheel is:

$$_oT_m^{-1} {}_oW_1 \bar{c} \qquad (10)$$

Dressing the grinding wheel on the machine generally has a positive effect on part accuracy. For instance, if there is an error in the X parallelism between the grinding wheel axis of rotation and the Z axis, then on-machine dressing will create a taper on the face of the grinding wheel that tends to compensate for the error in parallelism. In some instances, on-machine dressing will create more complex geometries on the face of the grinding wheel. For instance, if there is an error in the Y parallelism between the axis of rotation of the grinding wheel and the Z axis, then the face of the grinding wheel will be concave.

Using the Simulation Results Errors Shapes

In the machining simulation described above, error sources can be activated individually by setting all but one of the error source values to zero. The resulting set of points on the surface of the part is a distinct "error shape" associated with the active error source. Error shapes of a wide variety of errors can be stored, displayed and analyzed. For errors that are single valued, such as squareness or parallelism, the error can be activated by placing an estimated value of the error source into the simulation. If the error is multiple valued, like straightness, roll, pitch or yaw error, then the error can be measured and loaded into the machining simulation. If the error has not been measured, the model can still be used by making assumptions. For a set of data generated by activating a once per revolution lead error in the x axis lead screw of the CNC grinding machine, the error can be assumed to be sinusoidal, although a once per revolution lead error can have any periodic shape. The peak-to-peak magnitude of the error can be taken from the lead screw manufacturer's specifications. Data sets such as this one have several properties that make them especially valuable:

1) They contain qualitative information. The distinctive pattern of the plots are important for analyzing and diagnosing errors. For single valued error sources, the error sources will match post process gauging data if modeled properly. For error sources that are purely geometric or kinemetric, the results tend to be especially accurate. For multiple valued error sources, whose error source has been assumed, the error shapes may not exactly match measured errors, but should reveal qualitative information about the pattern of the error. For example, although once per revolution lead errors may not be completely accurate, the lower frequency of oscillations in error at the top dead center and bottom dead center will be evident no matter what the particular form the error has.

2) They contain quantitative information. The data points can be used to calculate values of error in size, form, and location. For the CNC crank pin grinding machine, the size, index, throw, taper, cylindricity, parallelism, and center deviation of all crank pins on the shaft can be calculated. For other part types, different measures of accuracy will be appropriate. The ratio of form error in the part to error source value provides a measure of the sensitivity to the error source of the form tolerance of a specific part.

3) They scale linearly. The errors at discrete points usually scale linearly with the magnitude of the error source. If the magnitude of the error source doubles, the error at each point doubles but the shape of the error does not change. The linearity is due to the fact that machine tool errors are generally very small relative to the dimensions of the machine so that terms containing sines are nearly linear, and second order terms are almost always negligible. Such a property makes it possible to employ the superposition principle in further analysis. Errors will not scale linearly if the error source coupling mechanisms are significantly nonlinear or if the angular error motions are large. Linearity can be tested by using the simulation to plot part error value versus error source values over the range of interest.

Manual Diagnosis

Qualitative information from error shapes aids in diagnosis of their source. Error sources can be diagnosed using ball bar tests, where one error shape is developed for each of a set of anticipated error sources. Individual error sources are mathematically modeled to determine their effects on the error motions of rigid bodies in the machine. The error motions are used in a kinematic model of both the machine tool and the ball bar itself to compute the error shape. The error shapes are plotted and are visually compared to error traces from ball bar tests.

The machining simulation can generate a set of error traces that can apply to any part built on any machine. Unlike conventional traces, which apply only to ball bar tests and only to NC machine tools with three orthogonal axes, the error shapes produced according to the method of the present invention can be applied using post process gauging data instead of ball bar tests. This yields many advantages:

1) Some errors, such as tool chatter, will not be evident from ball bar tests, but can be potentially modeled in a machining simulation.

2) In some cases, post process gauging data is collected for statistical process control. By employing the simulated error shapes, already available data can be used for the diagnosis and down time for performing the ball bar tests can be avoided.

3) Ball bar tests limit the motion of the machine to the surface of a half sphere. Employing the virtual machining simulation approach allows more faithful reproduction of the conditions under which errors occur.

The post process gauging data must have an adequate signal-to-noise ratio. If not, the error shape to be matched will be masked by noise. The source of the errors in the parts has to be among the errors anticipated and simulated. If an error pattern arises in the parts, that does not match any anticipated error sources, then the simulation can be used to experiment with new error sources.

A good match between simulated and measured error shapes does not guarantee that the actual source of the error has been identified. It is conceivable that some anticipated source of error has an error shape very similar to one of the errors included in the simulation. The way to confidently diagnose the source of an error is to measure the variations in the error source and establish a statistical correlation with the magnitude of the measured error in the part.

Automated Diagnosis

Manual diagnosis of errors in a machine tool is robust but there are some conditions under which a computer automated procedure is preferable. If the number of anticipated error sources is large, manual diagnosis may become overwhelming. The measured data would have to be compared to a large number of simulated error shapes. If more than a few error shapes are superposed, it may be difficult for a person to distinguish all of the contributing patterns. If the full pattern of error across a part is complex, it may be difficult to display and interpret. In crank pin grinding, for example, some errors can only be characterized by a plot of errors on all the crank pin s and at several axial locations on each pin. On the other hand, for a computer more complex patterns of error provide more power to discriminate among different error sources.

To compensate for the drawbacks of manual diagnosis, the method of the present invention can be incorporated in an automated system, such as a computer program, which performs a least squares fit of post process gauging data (preferably from many parts) with a linear combination of error shapes stored in a data base. If the error shapes are generated by activating one unit of error source in the machining simulation (one micrometer or microrad depending upon the context) then the coefficients give the estimated magnitude of the error source. Because the error shapes are multiplied by single valued coefficients, only single valued error source may be diagnosed using least squares. Multiple valued error sources may be parameterized to create one or more single valued error source.

Great care must be taken in employing such a procedure since least squares regression techniques are only valid if the errors in the data not accounted for in the proposed model have a mean of zero, have constant variance, follow a normal distribution, and are independent. Further, the independent variables of the regression model must be truly independent. If any of these assumptions are violated, then the results of the diagnostic procedure may be entirely inaccurate. The following discussion of the assumptions used in automated error diagnosis includes the meaning of the assumptions, how to detect violations, and corrective actions to take if the assumptions are violated.

Zero mean: The sum of the differences between the measured part errors and those predicted by superposing error shapes must not be different from zero to a statistically significant degree. The assumption will generally hold for machining simulations if one or a combination of the error sources causes a pure scaling of the errors in the part. For example, in a CNC crank pin grinding machine, deflection of the grinding wheel away from the work due to higher than normal cutting forces, causes almost pure errors in the size of the crank pins. In most machine tools, a difference in the coefficient of thermal expansion between the machine and the work will also cause scaling errors. If the assumption is violated, then the proposed model is inadequate to explain the observed deviation. There is some significant systematic error source reflected in the post process gauging data that is not modeled in the error shape data base. Generally, the violation can be corrected by adding a pure scaling error source to the model.

Constant variance: The difference between the measured part errors and those predicted by superposing error shapes must not vary by statistically significantly different amounts at different locations on the part. This assumption can be tested by plotting the residuals of the least squares fit over the surface of the part. If the scatter of the residuals is consistently and significantly higher on some areas of the part, then the assumption has been violated. Such violations are very common in machining. Any process in which a random error has a constant variance, but changing gain over the surface of the part, will violate the assumption. In CNC crank pin grinding, for example, a constant amplitude vibration of the x axis carriage causes greater variation in the surface finish of the crank pin at the top dead center than at the 90 degree and 270 degree positions. When variance in the errors is not uniform over the surface of the part, the automated diagnostic procedure will remain valid if a weighted least squares method is employed.

Normal distribution: The differences between the measured part errors and those predicted by superposing error shapes must not be other than Gaussian to a significant degree. This assumption can be tested by plotting the residuals at a given point on the surface of the part. If many parts have been measured, a symmetrical bell curve should occur in the data. A table of random normal deviations may also be used as an additional test. In machining, many individual sources of random are not normally distributed. However, the central limit theorem states that the superposition of several non-normally distributed random variables tends to be normally distributed. Therefore, this assumption is generally a safe one.

Independence of the errors: A plot of the differences between the measured part errors and those predicted by superposing error shapes over the surface of the part can exhibit no significant systematic component. This assumption will be violated when one or more of the error shapes is significantly in error due to mistakes in the machining simulation. Such errors can be avoided by experimental verification of the simulation results. Once an error shape has been experimentally determined, it may be preferable to use experimental results in the error shape database in lieu of simulation results. The assumption of the independence of the errors will also be violated if some source of systematic error in the post process gauging data is not included in the error shape data base. To correct the assumption and improve the diagnosis results, one must add the missing error source shape. The task of producing a complete set of error shapes for a machine is difficult, but the machining simulation may help by allowing experimentation with new error sources to match the pattern observed in the residuals.

Independence of the (assumed) independent variables of the regression model: The error source values must not be correlated to a statistically significant degree. For example, an error due to uniform thermal expansion of a scale and a deflection due to mismatch of coefficients of thermal expansion are both related to ambient temperature and are therefore correlated. To apply the automated diagnostic procedure, correlated error source values must be combined into a single error source value.

Checking the assumptions as described above does not guarantee that the assumptions have not been violated; It merely improves the odds that they have not been violated.

Even if the assumptions are valid, the coefficients of the fit will not be meaningful if the error shapes in the database are nearly linearly dependent. If one of the error shapes in the database can be formed or closely matched by linearly combining any set of other anticipated error shapes then the set of coefficients of the fit is not unique. The same quality of fit could be achieved with a different vector of coefficients. However, if assumptions are valid, then testing of the general linear hypothesis for regressions can be used to solve the problem of multicolinearity. This statistical procedure can determine which coefficients contribute to the regression model in a significant proportion. Thus, error shapes that do not appear to participate in the error observed in the post process gauging data are removed from the regression model. General linear hypothesis testing also determines which coefficients appear to be linearly related and in what proportions. Some error shapes can be removed from the model, others combined into single coefficients to generate "reduced" models.

Care must be taken in generating the error shapes which serve as input to the least squares fitting program. As an example, for a CNC grinding machine which for which an error compensation table as been constructed, if there remain unacceptable parallelism errors evident in the crank shafts, then it is useful to be able to identify which build parameters are out of specification. To perform the diagnosis, the least squares fitting program must have as an input a set of error shapes which have been compensated for size, roundness, index and taper errors, since this is the case for post process gauging data.

Error Budgeting

An error budget is a systematic account of the sources of error in a machine tool. It can be used to estimate the accuracy of a machine during it's design. It can also help to identify the major contributors to overall machine error so that better design decisions can be made. To form an error budget, one must:

1) Estimate the magnitude and statistical distribution of error sources. Any results from an error budget will be only as good as the estimates of the error sources.

2) Model the mechanism that converts the error source into errors in part shape (or at least relative position of the tool to the work). This task is accomplished by the virtual simulation framework of the present invention.

3) Combine errors from various sources with different statistical distributions. This has traditionally been done using empirical rules of thumb.

Machine error can be categorized as systematic, random or hysteretic. Random error sources are errors that vary under "apparently equal conditions" either from part to part, from machine to machine, or as a function of time (depending on the context of the analysis). The term "random" does not imply that the variation in error has no cause, only that causes have not been determined analytically. Systematic errors are those error sources that always have the same value and sign at a given position and under given circumstances. Hysteretic errors are errors that have a nearly constant magnitude but that vary in sign with changing conditions.

Although part errors can be superposed linearly point-by-point, the values of form errors are not additive. An error in the height of the x axis carriage of the NC grinding alone might cause a 1.4 micron error in the cylindricity of a crank pin. A cumulative lead error in the x axis lead screw might cause a 1.5 micron error in cylindricity. These errors should cause constant errors in a given machine and therefore should be considered systematic. When the two errors are superposed, they cause only a 1.5 micron error in cylindricity. Following the convention of adding systematic errors results in a vastly over conservative estimate. If such errors compound over dozens of error sources, then estimates of machine accuracy could be in error by an order of magnitude or more.

The foregoing example shows that error sources combine to affect errors through complicated geometric interactions. As a result, it is difficult to develop statistical procedures or even empirical rules for combining errors of form. These errors will be even greater for combining random errors. To solve the problem of combining errors of form, a monte carlo simulation is employed, as shown in FIG. 4.

The tool allows the user to define the probability distribution function (pdf) of various sources of error. For a designated number of trial parts, the program randomly samples from the user defined pdfs to determine the magnitude of the error in each individual part. The program uses the source magnitudes to linearly superpose the source error shapes drawn from a database. The result in an error shape for that particular trial part. The error shape is processed to determine errors in size, shape, and profile. The values of the virtual part errors are stored for each trial and later can be used to characterize the statistical distribution of the errors in several ways. For example, histograms of the error distributions can be displayed, mean and standard deviation can be calculated, and the percentage of parts out of tolerance limits can be estimated.

The monte carlo error combination program should be valuable to machine designers to rationally allocate build tolerances for machine tools and other manufacturing equipment such as robots and transfer line equipment. It may also be valuable to engineering managers and engineers in specifying the allowable variance in any variables known to affect the accuracy of a manufacturing process, such as ambient temperature, variance of geometry that mates with a fixture, coolant flow rates, etc.

Having described several embodiments of the method of the present invention for virtual machining in accordance with the present invention, it is believed that other modifications, variations and changes will be suggested to those skilled in the art in view of the description set forth above. It is therefore to be understood that all such variations, modifications, and changes are believed to fall within the scope of the invention as defined in the appended claims.

What is claimed is:

1. A method for virtual machining to predict the accuracy of parts to be made with machine tools, to allocate errors of said machine tools and diagnose a source of said errors, comprising the steps of:

performing a simulation taking into account nominal geometry of said machine tool, commanded machine tool motions as a function of time, error motions of said machine tool as a function of time, and a shape of a cutting tool;

calculating an error shape which is a set of discrete points on a surface of said part based upon position, orientation, direction of motion and shape of said cutting tool; and predicting a magnitude and pattern of errors for said part.

2. A method as recited in claim 1, wherein said calculating step is based on a homogeneous transformation matrix model of said machine tool.

3. A method as recited in claim 2, wherein said machine tool geometry is derived from one of machine drawings and a CAD database, said commanded machine tool motions are determined from one of control mathematics and nominal part geometry, and said error motions are determined from anticipated sources of error from said homogeneous transformation matrix model.

4. A method as recited in claim 3, wherein said machine tool geometry, said commanded machine tool motions, and said error motions are used to determine said cutting tool position, said cutting tool orientation, and said cutting tool position is used to determine tool velocity.

5. A method as recited in claim 4, wherein said cutting tool velocity, position and orientation are used to determine a shape of said tool.

6. A method as recited in claim 2, wherein said error motions are determined from one of engineering estimates and computer models of sources of error in a machine tool.

7. A method as recited in claim 2, wherein said homogeneous transformation matrix model is one of three types of matrices, comprising:

matrices which describe geometry of said machine tool in a home position, matrices which describe a pose of said machine tool resulting from said commanded machine tool motions, and matrices which describe all variations in performance of said machine tool from nominal.

8. A method as recited in claim 1, wherein said machine tool geometry is derived from one of machine drawings and a CAD database.

9. A method as recited in claim 1, wherein said commanded machine tool motions are determined from one of control mathematics and nominal part geometry.

10. A method as recited in claim 1, further comprising the step of calculating a location of a point on a surface of said part.

11. A method as recited in claim 10, wherein said step of calculating a location of a point, comprises the steps of:

transforming a location of a point along an axis of rotation of said cutting tool into a local coordinate system of said part, calculating a direction of motion of that point, and constructing a vector perpendicular to both said direction of motion of said point and said axis of rotation of said cutting tool and originating at said point along said axis of rotation of said cutting tool and having a length equal to a radius of said cutting tool at said point along said axis of rotation of said cutting tool;

said radius of said tool being a known function of said axial location and an endpoint of said vector is a position on said surface of said part.

12. A method as recited in claim 1, wherein a monte carlo simulation is employed to estimate a statistical distribution of errors in machined parts, wherein for a designated number of trial parts probability distribution functions are sampled to determine a magnitude of an error source for each individual part.

13. A method as recited in claim 12, wherein said magnitudes are multiplied by error shapes, point by point, and said error shapes are superposed to yield an error shape for a particular trial part, said particular part error shape is processed to determine errors in size, form and profile.

14. A method as recited in claim 13, wherein said values of said errors are stored for each trial and are used to produce a statistical distribution of said error as one of a histogram, a mean value, a standard deviation, and percentage out of tolerance.

15. A method as recited in claim 13, wherein error shapes for a variety of error sources are maintained in a database.

16. A method as recited in claim 1, wherein said error shape is associated with an error source which is produced by setting all but one error source value to zero, to yield a set of points on a surface of said part, distances between said points on said surface of said part to corresponding points on an ideal part are ordered into a set which is a distinct error shape associated with said error source.

17. A method as recited in claim 16, comprising:

multiplying each error value of each error shape by a gain factor, each error shape having a distinct gain factor;

summing corresponding error values of each error shape to yield a composite error shape;

comparing said composite error shape to post process gauging data; and varying said gain factors of said each error shape to minimize a difference between said composite error shape and said post process gauging data.

18. A method as recited in claim 17, further comprising the step of employing linear regression to minimize a sum of squared differences between said composite error shape and said post process gauging data.

19. A method as recited in claim 1, wherein said method is incorporated in an automated system to perform a least squares fit of said post process gauging data with a linear combination of error shapes stored in a database.

20. A method as recited in claim 1, wherein said method is used to produce a systematic account of sources of error in said machine tool, to estimate an accuracy of a machine during design, and to identify major contributors to overall machine error so that better design decisions can be made.

21. A method as recited in claim 1, further comprising the step of predicting a statistical distribution of part size, form and profile errors in a population of parts by superposing said error shapes sampled from statistical distributions of error sources.

22. A method as recited in claim 1, further comprising the step of diagnosing machine errors by matching post process gauging data with a linear combination of said error shapes.

23. A method for virtual machining to predict the accuracy of crank pins made with a grinding machine, to allocate errors in design and manufacture of said grinding machine and diagnose a source of said errors, comprising the steps of:

calculating error shapes of a crank pin based upon a position, orientation, velocity and shape of a said grinding wheel;

predicting a statistical distribution of crank pin size, form, and profile errors in a population of said crank pins by superposing said error shape;

diagnosing grinding machine errors by matching post process gauging data with a linear combination of said error shapes;

predicting a magnitude and pattern of errors for said crank pin;

performing a simulation taking into account geometry of said grinding wheel, commanded grinding wheel motions as a function of time, error motions of said grinding wheel as a function of time, and a shape of said grinding wheel; and outputting a set of discrete points on a surface of said crank pin.

* * * * *